United States Patent
Ahn et al.

(10) Patent No.: US 7,492,893 B2
(45) Date of Patent: Feb. 17, 2009

(54) ROTATION OPEN AND CLOSE TYPE MOBILE TERMINAL

(75) Inventors: Sung-Woong Ahn, Seoul (KR); Sang-Hoon Shin, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 840 days.

(21) Appl. No.: 10/998,092

(22) Filed: Nov. 24, 2004

(65) Prior Publication Data

US 2005/0110753 A1 May 26, 2005

(30) Foreign Application Priority Data

Nov. 25, 2003 (KR) .................... 10-2003-0084167

(51) Int. Cl.
*H04M 1/00* (2006.01)
*H04M 9/00* (2006.01)

(52) U.S. Cl. ............................. 379/433.13; 379/433.04; 455/575.1

(58) Field of Classification Search ............ 379/433.01, 379/433.11, 433.13, 433.04; 455/575.1, 455/575.4, 90.3; 348/14.08
See application file for complete search history.

(56) References Cited

U.S. PATENT DOCUMENTS

| 6,865,406 | B2 * | 3/2005 | Park ....................... 455/575.3 |
| 6,879,828 | B2 * | 4/2005 | Virtanen et al. .......... 455/426.1 |
| 7,187,958 | B2 * | 3/2007 | Nishijima et al. ........ 455/575.3 |
| 7,200,429 | B2 * | 4/2007 | Park et al. ................ 455/575.4 |
| 7,242,975 | B2 * | 7/2007 | Bae et al. ................. 455/575.3 |
| 2003/0013417 | A1 * | 1/2003 | Bum ........................... 455/90 |
| 2004/0203527 | A1 * | 10/2004 | Matsumoto ................ 455/90.3 |

FOREIGN PATENT DOCUMENTS

KR 10-2002-0014945 A 2/2002

* cited by examiner

*Primary Examiner*—Curtis Kuntz
*Assistant Examiner*—Tuan D Nguyen
(74) *Attorney, Agent, or Firm*—Lee Hong Degerman Kang & Waimey

(57) ABSTRACT

A rotation open and close type mobile terminal comprises a terminal body; a display unit connected to be rotatable horizontally at an upper surface of the terminal body and mounted with a display window; and a hinge unit mounted between the terminal body and the display unit and supporting to horizontally rotate the display unit within a set range, thereby implementing a wide screen at the display window.

22 Claims, 7 Drawing Sheets

US 7,492,893 B2

ROTATION OPEN AND CLOSE TYPE MOBILE TERMINAL

CROSS-REFERENCE TO RELATED APPLICATIONS

Pursuant to 35 U.S.C. § 119(a), this application claims the benefit of earlier filing date and right of priority to Korean Application No. 84167/2003, filed on Nov. 25, 2003, the contents of which are hereby incorporated by reference herein in their entirety.

BACKGROUND OF THE INVENTION

1. Field of the Invention

The present invention relates to a mobile terminal, and more particularly, to a rotation open and close type mobile terminal which enables to implement a wide screen by opening/closing a display unit by rotating the display unit in a horizontal direction.

2. Description of the Background Art

FIG. 1 is a perspective view of a folder type mobile terminal in accordance with the conventional art.

The folder type mobile terminal according to the conventional art includes: a terminal body 110; a folder 120 openably and closably connected to an upper end of the terminal body 110; a hinge connection unit 130 formed between the terminal body 110 and the folder 120 and hinge-connecting the folder 120 to the terminal body 110; and a camera 140 for taking a picture, rotatably mounted at one side of the hinge connection unit 130.

There are provided a key pad 112 for inputting information by a user and a microphone 114 for transmitting a voice at a front surface of the terminal body 110. An antenna 116 for transmitting/receiving an electric wave is mounted at an upper end of the terminal body 110.

In addition, a display window 124 for displaying various information and a receiver 126 for receiving a voice are mounted at a front surface of the folder 120.

In a mobile terminal according to the conventional art, when the user uses the mobile terminal and opens the folder 120, the folder 120 is rotated centering on the hinge connection unit 130 to be opened, and the display window 124 is exposed to display various information.

However, in the conventional folder type mobile terminal, the display window is installed in a longitudinal direction of the folder, and a screen is displayed in a width direction of the display window. Therefore, when text broadcasting or an image screen is displayed, a wide screen can not be implemented.

SUMMARY OF THE INVENTION

Therefore, an object of the present invention is to provide a rotation open and close type mobile terminal which enables to implement a wide screen by rotating a display unit on plane from the center of a terminal body of the mobile terminal.

To achieve these and other advantages and in accordance with the purpose of the present invention, as embodied and broadly described herein, the rotation open and close type mobile terminal of the present invention includes: a terminal body; a display unit connected to be rotatable horizontally at an upper surface of the terminal body and mounted with a display window; and a hinge unit mounted between the terminal body and the display unit and supporting the display unit to be horizontally rotated within a set range.

A camera unit for carrying out image photographing and video call communication and a plurality of key pads manipulated by the user are mounted at the terminal body.

The camera unit is mounted at one end of the terminal body, and the key pads are mounted at the other end of the terminal body.

Speakers for implementing a three dimensional surround sound are separately mounted at both ends in view of a longitudinal direction of the display unit.

The display window mounted at the display unit implements a small screen when the display unit is closed, while the display unit implements a large screen when the display unit is horizontally rotated to be opened.

The hinge unit includes: a first hinge member mounted at the terminal body; a second hinge member mounted at the display unit and rotatably inserted into the first hinge member; and a rotation range restricting unit formed between the first hinge member and the second hinge member and restricting a rotation range of the display unit.

The rotation range restricting unit includes: a stopper protruding toward an outer circumferential surface of the second hinge member; and a groove formed by removing an upper end of the first hinge member with an angle approximately corresponding to 90 and restricting a moving range of the stopper to an angle of 90.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

There can be a plurality of embodiments of a rotation open and close type mobile terminal in accordance with the present invention, of which the most preferred one will now be described.

Figure 1:
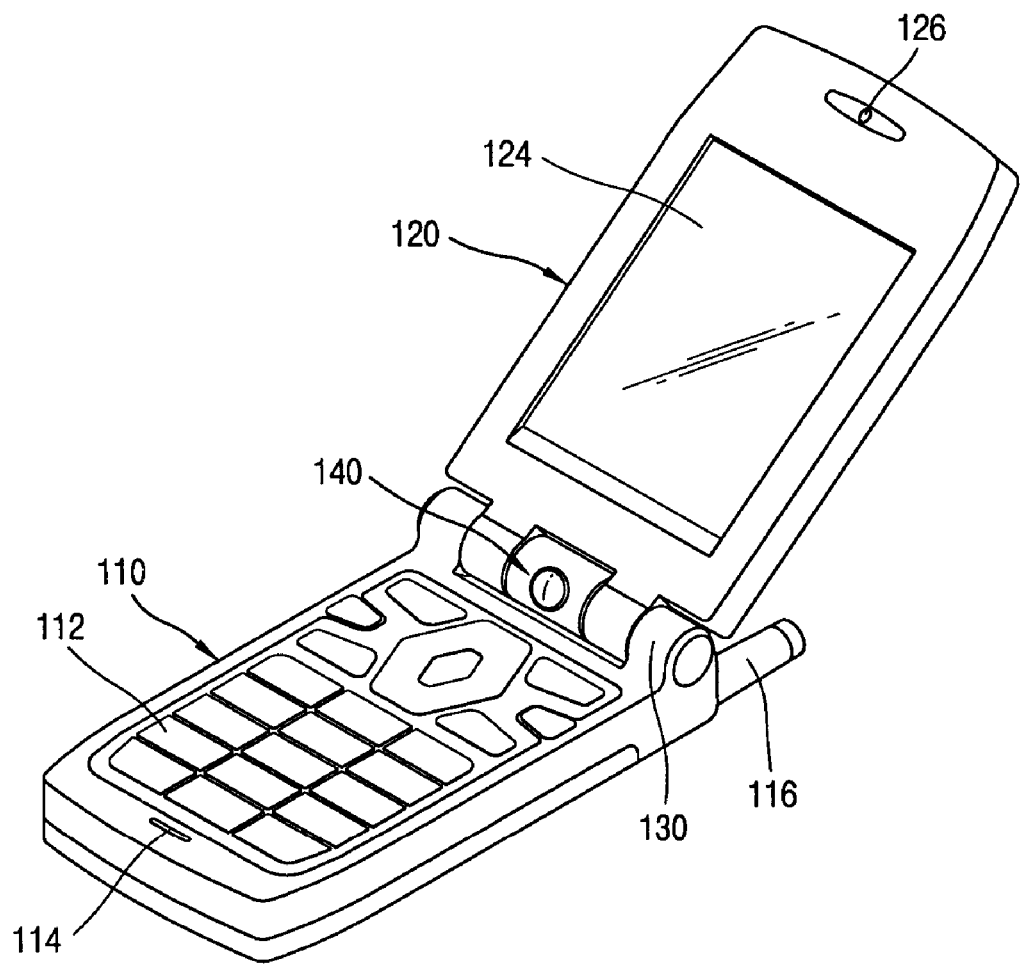
FIG. 1 is a perspective view of a folder type mobile terminal in accordance with the conventional art.
Figure 2:
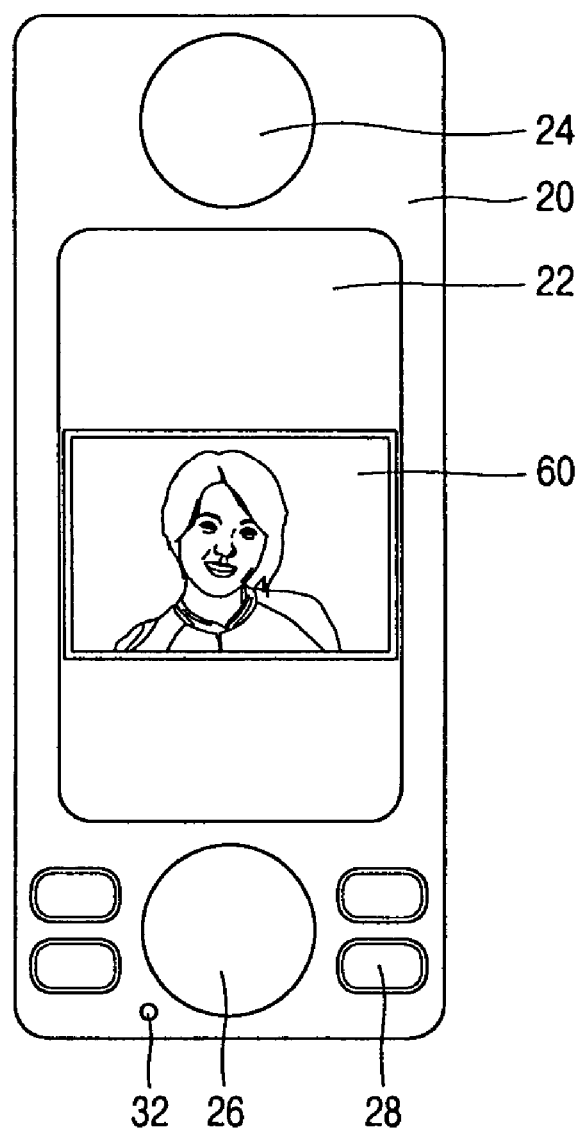
FIG. 2 is a plane view of a rotation open and close type mobile terminal in accordance with the present invention.
Figure 3:
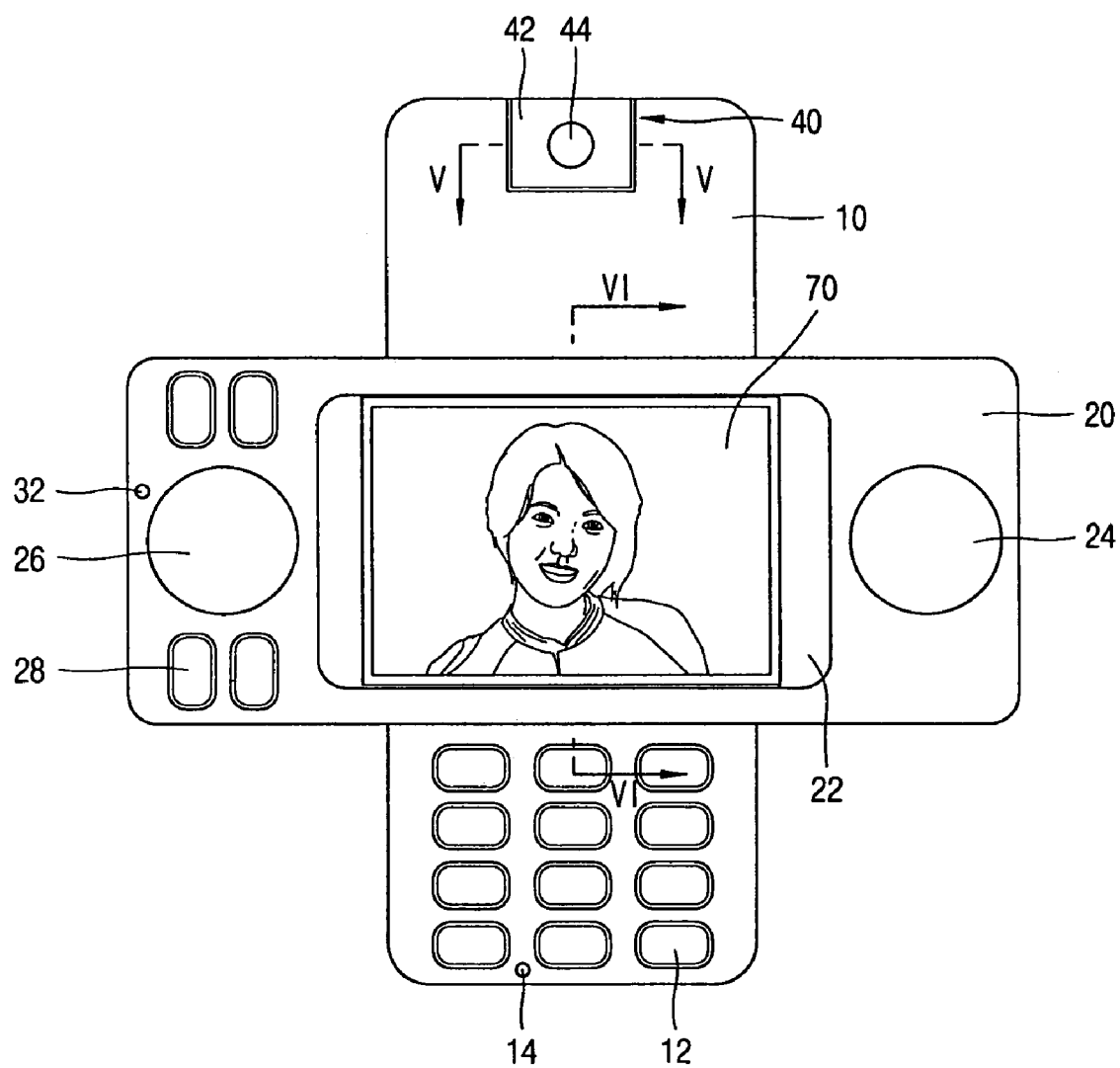
FIG. 3 is a plane view showing a display unit of a mobile terminal according to the present invention is opened.
Figure 4:
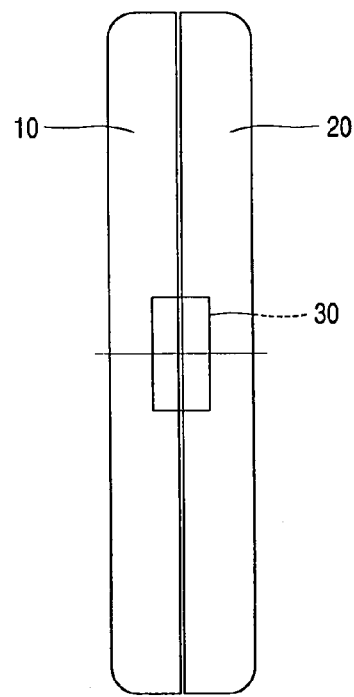
FIG. 4 is a side view of a rotation open and close type mobile terminal in accordance with the present invention.

FIG. 2 is a plane view of a rotation open and close type mobile terminal in accordance with the present invention, FIG. 3 is a plane view showing a display unit of a mobile terminal according to the present invention is opened, and FIG. 4 is a side view of a rotation open and close type mobile terminal in accordance with the present invention.

A mobile terminal according to the present invention includes: a terminal body 10 provided with a main PCB having various circuit components installed therein and mounted with a key pad at a front surface thereof; a display unit connected to be rotatable horizontally at an upper surface of the terminal body and mounted with a display window 22 for displaying information the user wants; and a hinge unit 30 mounted between the terminal body 10 and the display unit 20 and connecting the display unit 20 to the terminal 10 in order that the display unit 20 can be horizontally rotated.

A camera unit 40 for performing image photographing and video call communication is rotatably mounted at one side of the terminal body 10, and a plurality of key pads 12 the user manipulates and a microphone 14 for transmitting a voice are mounted at the other side of the terminal body 10.

Figure 5:
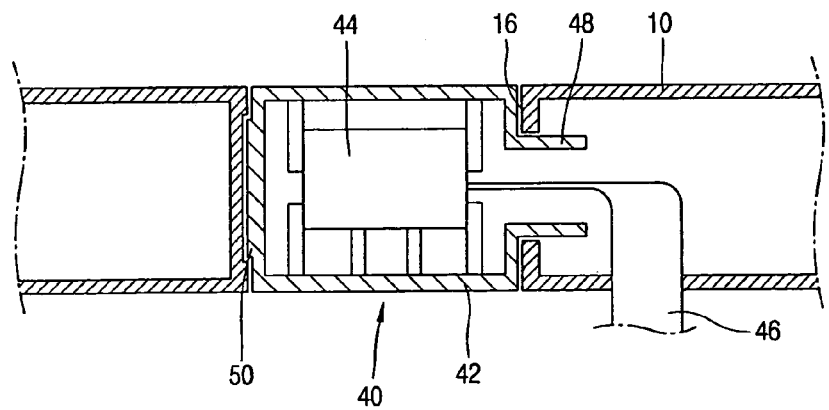
FIG. 5 is a cross sectional view taken along line V-V in FIG. 3.

Here, as shown in FIG. 5, the camera unit 40 includes: a camera housing 42 rotatably mounted at a camera mounting unit 16 formed at one end portion of the terminal body 10; a camera 44 mounted in the camera housing 42 and carrying out image photographing and video call communication ; and a data line 46 for transferring a signal inputted to the camera 44 to the main PCB.

The camera housing 46 is cylindrical. A hinge cylinder portion 48 rotatably inserted into the camera mounting unit 16 and opened in order for the data line 46 to pass therethrough is formed at one side of the camera housing 46. A hinge protrusion 50 formed at the other side of the camera housing 46 and rotatably supported by the camera mounting unit 16 is formed.

A front surface of the display unit 20 has the display window 22 for displaying an image and various information in a longitudinal direction. Speakers 24 and 26 for implementing a three-dimensional surround sound and receiving a voice signal are respectively installed at both edges of the display unit 20. A key pad 28 the user manipulates is mounted at an upper surface of the display unit 20. And, a microphone 32 is installed at the display unit 20, and it is for receiving a voice signal in order that call communication can be made even when the display unit 20 is horizontally rotated to be opened.

In this way, since the key pad is installed at the display unit 28, the user can input desired information even when the display unit 20 is closed.

And, since the display window 22 is formed at an entire front surface in a longitudinal direction of the display unit 20, a large screen can be implemented. Namely, as shown in FIG. 2, when the display unit 20 is closed, a small screen 60 is implemented in a width direction of the display unit, a direction the user looks at, and when the display unit 20 is horizontally rotated to be opened, a large screen 70 is implemented in a longitudinal direction of the display unit 20.

The two speakers 24 and 26 are respectively mounted at both edges of the display unit 20 and therefore a distance between the two speakers 24 and 26 can be appropriately maintained, thereby maximizing an effect of a three dimensional surround sound.

Figure 6:
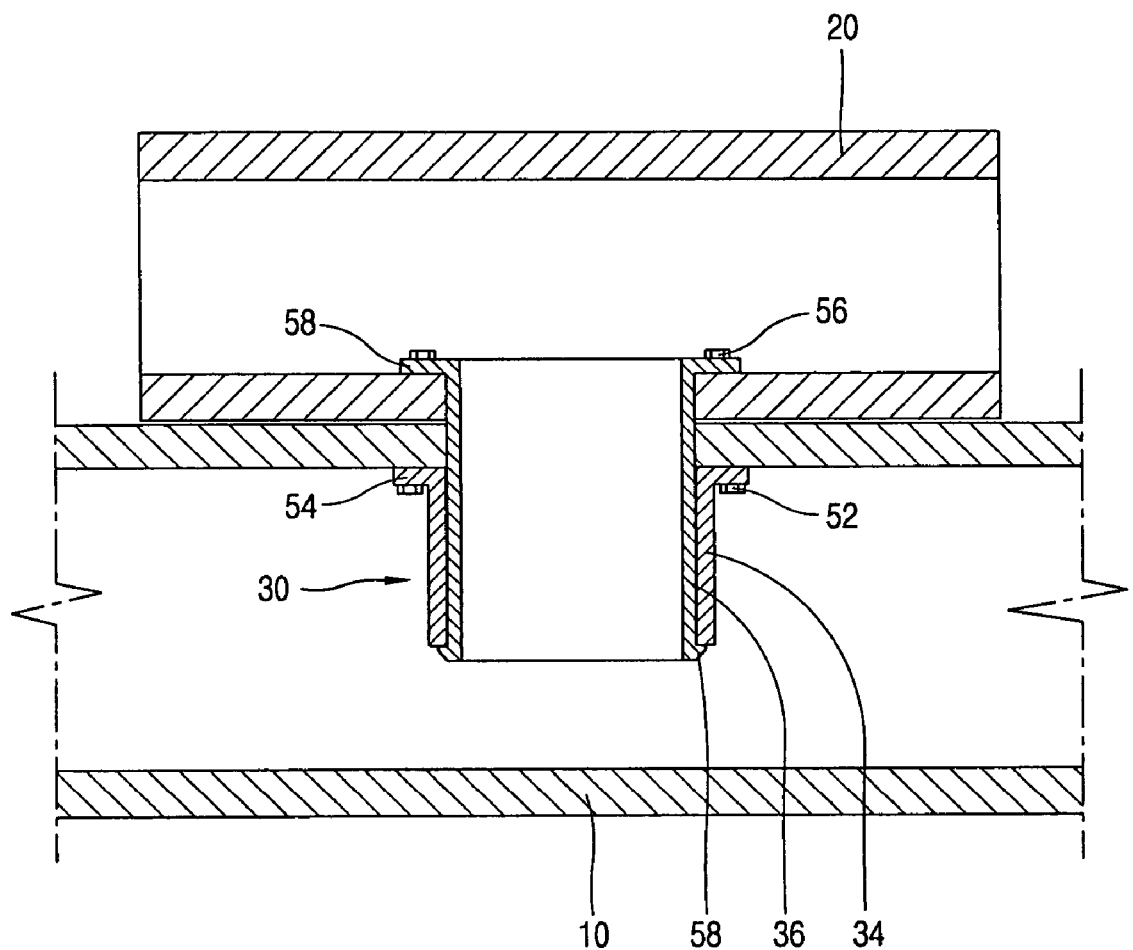
FIG. 6 is a cross sectional view taken along line VI-VI in FIG. 3.
Figure 7:
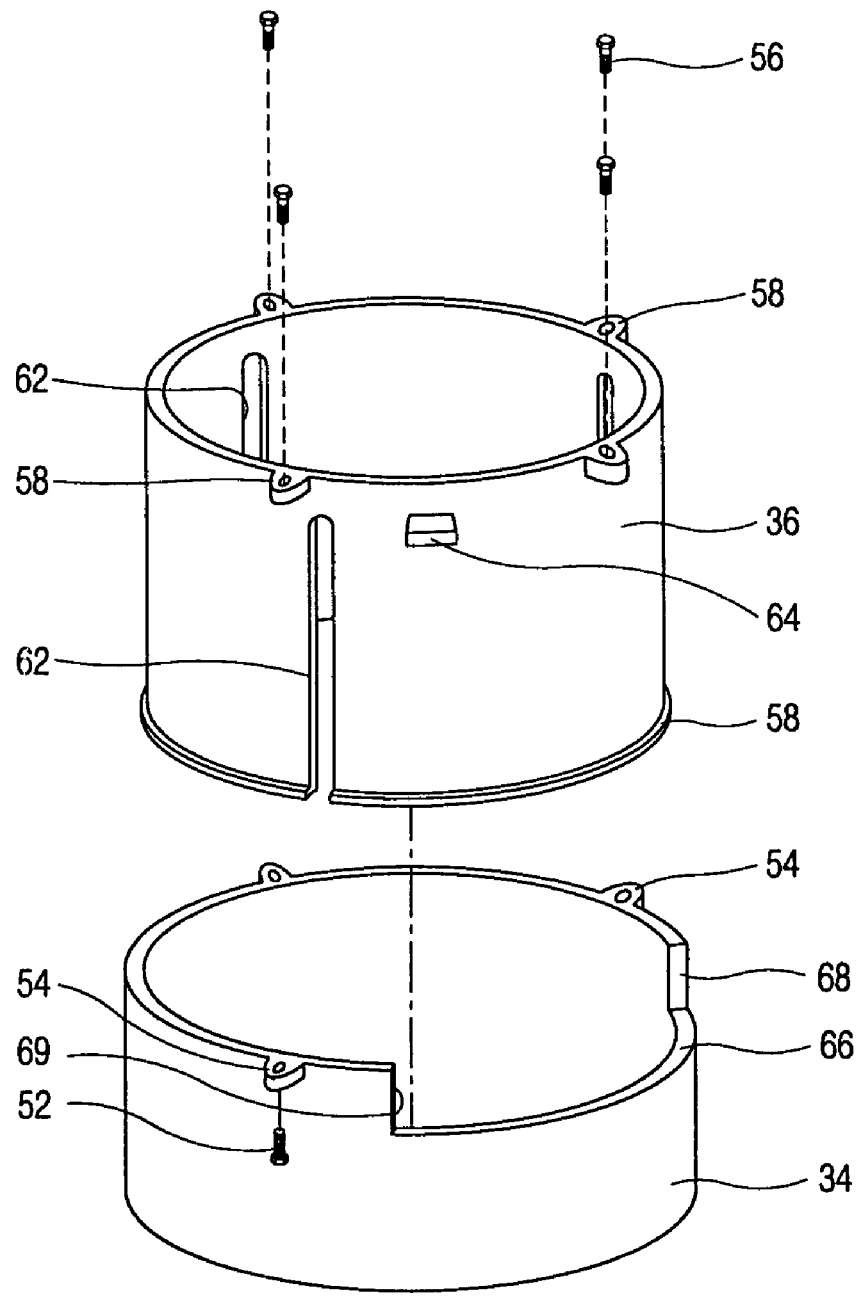
FIG. 7 is a disassembled perspective view of a hinge unit in accordance with the present invention.

FIG. 6 is a cross sectional view taken along line VI-VI in Figure, and FIG. 7 is a disassembled perspective view of a hinge unit in accordance with the present invention.

The hinge unit 30 includes: a first hinge member 34 mounted at the center of an upper surface of the terminal body 10; a second hinge member 36 mounted at the center of a lower surface of the display unit 20 and rotatably inserted into the first hinge member 34; and a rotation range restricting unit formed between the first hinge member 34 and the second hinge member 36 and restricting a rotation range of the display unit 20.

The first hinge member 34 is cylindrical. Bolt engaging units 54 bolt 56-engaged with the terminal body 10 are formed at an upper end of the first hinge member 34 at regular intervals.

The second hinge member 36 is a cylinder shape having a diameter enough for the member 34 to be rotatably inserted on an inner circumferential surface of the second hinge member 36. Bolt engaging units 58 bolt 56-engaged with the display unit 20 are formed at an upper surface of the second hinge member 36. A separation preventing protrusion 58 for preventing the second hinge member 36 from being separated by being stopped at an end portion of the first hinge member 34 is formed at a lower surface of the second hinge member 36.

Here, removed portions 62 are formed in a circumferential direction of the second hinge member 36 at regular intervals. When the second hinge member 36 is inserted into the first hinge member 34, the removed portions 62 make a diameter of the second hinge member 36 smaller and thus have the second hinge member 36 easily inserted into the first hinge member 34. After the second hinge member 36 is inserted into the first hinge member 34, the diameter of the second hinge member returns to its original size, and the first hinge member is stopped by the separation preventing protrusion.

The rotation range restricting unit for restricting a rotation range of the second hinge member 36 to an angle of 90 includes: a stopper 64 protruding toward an outer circumferential surface of the second hinge member 36; and a groove 66 at which the stopper 64 is moved, formed by removing an upper end of the first hinge member 34 with an angle approximately corresponding to 90°.

Stopping surfaces 68 and 69 are formed at both sides of the groove 66 so as to restrict a moving range of the stopper 64 to an angle of 90.

The hinge unit 30 constructed as described above is assembled as follows: By coupling the bolt engaging units 54 of the first hinge member 34 with an upper surface of the terminal body 10 through the bolts 52, the first hinge unit 34 is fixed to the terminal body 10. By engaging the bolt engaging units 58 of the second hinge member 36 with an lower surface of the display unit 20 through the bolts 56, the second hinge member 36 is fixed to the display unit 20. And, after the second hinge member 36 is inserted into the first hinge member 34, if the separation preventing protrusion 58 formed at the second hinge member 36 is stopped by an upper end of the first hinge member 34, assembling is completed.

At this time, the stopper 64 formed at the second hinge member 36 is inserted into the groove 66 formed at the first hinge member 34, thereby restricting the rotation range of the first hinge member 34.

An operation of the rotation open and close type mobile terminal having such construction will be described as follows.

Firstly, when the display unit 20 is closed, that is, when the display unit 20 and the terminal body 10 are overlapped with each other as shown in FIG. 2, voice communication and video communication can be made. Namely, a voice signal is transmitted through the microphone 32 mounted at the display unit 20 and received through the speakers 24. And, the user inputs information by manipulating the key pad 28 mounted at the display unit 20. At this time, a small screen 60 is displayed at the display window 22 mounted at the display unit 20 in a width direction of the display unit 20.

And, in case the display unit 20 is opened to use the camera unit 40 or the like, if the display unit 20 is rotated in a horizontal direction, the display unit 20 is rotated at an angle of 90 by an operation of the hinge unit 30 and is disposed in a cross form with the terminal body 10.

Figure 8A:
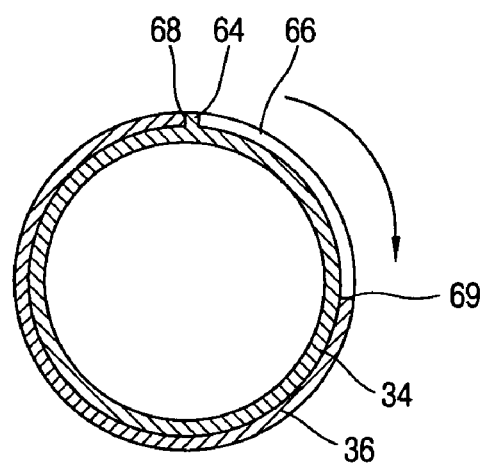
FIGS. 8A and 8B are views showing an operation of a hinge unit in accordance with the present invention.

Here, as for an operation of the hinge unit 30, as shown in FIG. 8A, when the display unit 20 and the terminal body 10 are overlapped with each other, that is, when the display unit 20 is closed, the stopper 64 formed at the second hinge member 36 remains to be stopped at the stopping surface 68 formed at the first hinge member 34.

Figure 8B:
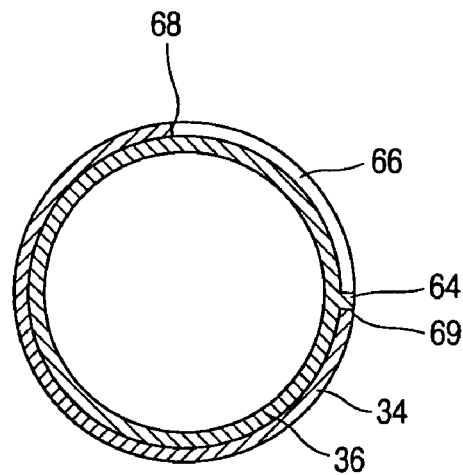

And, as shown in FIG. 8B, if the display unit 20 is rotated in a horizontal direction, the second hinge member 36 is rotated in a state of being inserted into the first hinge member 34. At this time, the stopper 36 formed at the second hinge member 36 is moved along the groove 66 and stopped at the stopping surface 69 formed at the first hinge member 34, and therefore the display unit 70 is rotated as much as an angle of 90. Then, the display unit 20 and the terminal body 10 are disposed in a cross form.

In this way, if the display unit 20 is opened, the camera unit 40 and the key pad 12 respectively mounted at both edges of the terminal body 10 are exposed to the outside, so that photographing and video call communication can be implemented using the camera unit 40, and various information can be inputted manipulating the key pad 12.

At this time, a screen of the display window 22 is displayed in a longitudinal direction of the display unit, thereby implementing the wide screen 70.

As so far described, the rotation open and close type mobile terminal according the present invention is provided with a hinge unit between a terminal body and a display unit, and makes the display unit rotated in a horizontal direction, and thus a wide screen can be implemented on the display window mounted at the display unit. Accordingly, the present invention has such advantages that in receiving TV broadcasting a display window can be displayed as a large screen, and so a user can watch text broadcasting with more convenience.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A rotation open and close type mobile terminal, comprising:
   a terminal body having a camera unit rotatably mounted on the terminal body and configured to capture an image, a first keypad, and a first microphone disposed on the terminal body and configured to enable voice communication;
   a display unit connected to an upper surface of the terminal body and rotatable horizontally with respect to the terminal body, wherein the display unit comprises a speaker and a display window; and
   a hinge unit mounted between the terminal body and the display unit and supporting the display unit to be rotated within a set rotation range,
   wherein the camera unit is covered by the display unit when the display unit is closed, and the camera unit is exposed when the display unit is horizontally rotated and opened.

2. The mobile terminal of claim 1, wherein the camera unit is located at an area proximal to one end of the terminal body, and the first keypad is located at another area proximal to another end of the terminal body.

3. The mobile terminal of claim 1, wherein the camera unit comprises:
   a camera housing rotatably inserted into a camera mounting unit formed at one end portion of the terminal body; and
   a camera mounted in the camera housing.

4. The mobile terminal of claim 3, wherein a hinge protrusion rotatably supported by the camera mounting unit is formed at one side of the camera housing, and a hinge cylinder portion opened in order that a data line for transferring a signal generated from the camera to a PCB can pass through and rotatably supported to the camera mounting unit is formed at the other side of the camera housing.

5. The mobile terminal of claim 1, wherein the first microphone is configured to enable voice communication when the display unit is rotated with respect to the terminal body.

6. The mobile terminal of claim 1, wherein the set rotation range of the display unit is within 90 degrees.

7. The mobile terminal of claim 6, wherein a second key pad is mounted on the display unit.

8. The mobile terminal of claim 1, wherein speakers for providing surround sound are separately mounted at both ends of a longitudinal direction of the display unit.

9. The mobile terminal of claim 1, wherein a second microphone is mounted on the display unit in order that call communication can be made when the display unit is closed.

10. The mobile terminal of claim 1, wherein the display window displays a small image when the display unit is closed and a large image when the display unit is horizontally rotated and opened.

11. The mobile terminal of claim 10, wherein when the display unit is closed, a small image is displayed in a width direction of the display window, and when the display unit is horizontally rotated to be opened, the large image is displayed in a longitudinal direction of the display window, and wherein the longitudinal direction is greater than the width direction.

12. The mobile terminal of claim 1, wherein the hinge unit comprises:
   a first hinge member mounted on the terminal body;
   a second hinge member mounted on the display unit and rotatably inserted into the first hinge member; and
   a rotation range restricting unit formed between the first hinge member and the second hinge member configured to restrict a rotation range of the display unit.

13. The mobile terminal of claim 12, wherein the first hinge member is cylindrical, and bolt engaging units bolt-engaged with the terminal body are formed at an upper end of the first hinge member at regular intervals.

14. The mobile terminal of claim 13, wherein the second hinge member is provided with removed portions in order to be easily inserted into the first hinge member in a circumferential direction at regular intervals.

15. The mobile terminal of claim 12, wherein the second hinge member is a cylinder shape having a diameter enough for the second hinge member to be rotatably inserted on an inner circumferential surface of the first hinge member, wherein bolt engaging units bolt-engaged with the display unit are formed at an upper surface of the second hinge member, and a separation preventing protrusion for preventing the second hinge member from being separated by being stopped at a lower end of the first hinge member is formed at a lower surface of the second hinge member.

16. The mobile terminal of claim 12, wherein the rotation range restricting unit comprises:
   a stopper protruding toward an outer circumferential surface of the second hinge member; and
   a groove formed by removing an upper end of the first hinge member with an angle approximately corresponding to 90 and restricting a moving range of the stopper to an angle of 90.

17. The mobile terminal of claim 1, wherein the mobile terminal of claim 1 is configured to receive a television broadcast signal so that when the display unit is rotated with respect to the terminal body, a wider display is utilized.

18. The mobile terminal of claim 1, wherein the camera unit is configured to enable a video call communication.

19. The mobile terminal of 1, wherein a plane of the display window is substantially parallel to a plane of the first keypad.

20. A method for displaying an image on a display unit of a rotation open and close type mobile terminal, the method comprising:
   displaying an image on the display unit, wherein the image is oriented in a width direction of the display unit and the image size is adjusted to be displayed within the width direction;
   rotating the display unit through a set rotation range with respect to a terminal body, wherein the display unit is connected to an upper surface of the terminal body; and
   displaying the image on the display unit, wherein the image is oriented in the longitudinal direction of the display unit and the image size is adjusted to be displayed in the longitudinal direction,
   wherein the camera unit is covered by the display unit when the display unit is closed, and the camera unit is exposed when the display unit is horizontally rotated and opened.

21. The method of claim 20, wherein the longitudinal direction is greater than the width direction.

22. The method of claim 20, wherein the image displayed in the longitudinal direction of the display unit is larger than the image displayed in the width direction of the display unit.

* * * * *